(12) United States Patent
Oide et al.

(10) Patent No.: US 12,107,300 B2
(45) Date of Patent: Oct. 1, 2024

(54) ENERGY STORAGE DEVICE COMPRISING CURRENT COLLECTOR PLATE WITH SPRING PORTION

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Ryuji Oide, Kariya (JP); Naoto Morisaku, Kariya (JP); Hiromi Ueda, Kariya (JP); Satoshi Morioka, Okazaki (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 17/480,730

(22) Filed: Sep. 21, 2021

(65) Prior Publication Data
US 2022/0094025 A1   Mar. 24, 2022

(30) Foreign Application Priority Data
Sep. 23, 2020   (JP) ................................. 2020-158383

(51) Int. Cl.
*H01M 50/552*   (2021.01)
*H01M 10/04*    (2006.01)
*H01M 50/531*   (2021.01)

(52) U.S. Cl.
CPC ..... *H01M 50/552* (2021.01); *H01M 10/0418* (2013.01); *H01M 50/531* (2021.01)

(58) Field of Classification Search
CPC ............. H01M 50/552; H01M 50/531; H01M 50/296; H01M 10/0418; H01M 4/70
See application file for complete search history.

(56) References Cited

U.S. PATENT DOCUMENTS

2009/0023059 A1*  1/2009  Kinoshita ........... H01M 50/242
                                              180/68.5
2013/0108916 A1*  5/2013  Song .................... H01M 50/55
                                              429/179

(Continued)

FOREIGN PATENT DOCUMENTS

| JP | 2007-213990 A | 8/2007 |
| JP | 2019-197670 A | 11/2019 |
| WO | 2019/003664 A1 | 1/2019 |

*Primary Examiner* — Haroon S. Sheikh
*Assistant Examiner* — Drew C Newman
(74) *Attorney, Agent, or Firm* — Sughrue Mion, PLLC

(57) ABSTRACT

The extraction portion of a current collector plate is configured to include a first piece portion extending in a direction orthogonal to the first direction from an outer edge portion provided on an edge of the flat plate portion when viewed from the first direction, a second piece portion extending in the first direction and having an attachment portion that attaches the extraction portion, and a bent portion being where a plate material configuring the extraction portion bends, and connecting the first piece portion and the second piece portion. A spring portion that is configured to relieve a stress acting on the extraction portion is provided between the connection portion to the outer edge portion and the attachment portion in the extraction portion. The spring portion includes at least a first bent portion being where the plate material bends other than at the bent portion.

5 Claims, 8 Drawing Sheets

(56) References Cited

U.S. PATENT DOCUMENTS

| | | | |
|---|---|---|---|
| 2013/0252080 A1* | 9/2013 | Naganawa | H01G 11/82 |
| | | | 429/179 |
| 2015/0056495 A1* | 2/2015 | Song | H01M 50/553 |
| | | | 429/160 |
| 2019/0348648 A1 | 11/2019 | Hase et al. | |
| 2020/0020904 A1 | 1/2020 | Takatsuji | |

* cited by examiner

ENERGY STORAGE DEVICE COMPRISING CURRENT COLLECTOR PLATE WITH SPRING PORTION

CROSS REFERENCE TO RELATED APPLICATIONS

This application claims priority to Japanese Patent Application No. 2020-158383 filed on Sep. 23, 2020, the entire contents of which are incorporated by reference herein.

TECHNICAL FIELD

The present disclosure relates to a power storage device.

BACKGROUND

As a power storage device in the related art, a power storage device including a plurality of stacked power storage modules is known. In addition, as a power storage module in the related art, a bipolar battery including a bipolar electrode having a positive electrode formed on one surface of an electrode plate and a negative electrode formed on the other surface is known. The plurality of power storage modules are stacked and restrained by restraint plates from both end portions in the stacking direction. A current collector plate having a flat plate portion is provided for the power storage module at the end portion in the stacking direction (Japanese Unexamined Patent Publication No. 2007-213990).

SUMMARY

In the power storage device described above, the current collector plate includes an extraction portion that extracts the current from the power storage module. There may be a problem that a breakage may occur in such an extraction portion due to vibration acting on the power storage device.

An object of the present disclosure is to solve the above problem and to provide a power storage device that can suppress the breakage of the extraction portion of the current collector plate during the vibration.

A power storage device in the present disclosure includes: a power storage module; a pair of current collector plates configured to be stacked to interpose the power storage module in a first direction; and a pair of restraint plates configured to restrain the power storage module and the current collector plate in the first direction. The power storage module is configured to include current extraction surfaces at both ends in the first direction. At least one of the current collector plates is configured to include a flat plate portion that is in electrical contact with the current extraction surface, and an extraction portion connected to the flat plate portion and extracting current from the power storage module. The extraction portion is configured to include a first piece portion extending in a direction orthogonal to the first direction from an outer edge portion provided on an edge of the flat plate portion when viewed from the first direction, a second piece portion extending in the first direction and having an attachment portion that attaches the extraction portion to a terminal block of the restraint plate, and a bent portion being where a plate material configuring the extraction portion bends, and connecting the first piece portion and the second piece portion. A spring portion that is configured to relieve a stress acting on the extraction portion is provided between the connection portion to the outer edge portion and the attachment portion in the extraction portion. The spring portion includes at least a first bent portion being where the plate material bends other than at the bent portion.

In the power storage device, at least one of the current collector plates includes an extraction portion that extracts the current from the power storage module. Therefore, the extraction portion can extract the current to the terminal block by being connected to the terminal block. Here, the extraction portion includes the first piece portion extending in a direction orthogonal to the first direction from the outer edge portion provided on the edge of the flat plate portion when viewed from the first direction, the second piece portion having the attachment portion that extends in the first direction and fixes the extraction portion to the terminal block, and the bent portion being where the plate material configuring the extraction portion bends, and connecting the first piece portion and the second piece portion. In such a shape, the bent portion between the first piece portion and the second piece portion functions as one of the starting points of deformation when attached to the terminal block. In addition, the distance between the bent portion and the attachment position to the terminal block is short. Therefore, when the second piece portion is attached at the attachment portion, there is a possibility that the stress near the attachment position may increase. If vibration occurs in this state, the extraction portion may be broken. On the other hand, the spring portion that relieves a stress acting on the extraction portion is provided between the connection portion to the outer edge portion and the attachment portion in the extraction portion. The spring portion includes at least a first bent portion being where the plate material bends other than at the bent portion. By forming such a spring portion between the connection portion of the extraction portion and the attachment portion, it is possible to relieve the stress that concentrates near the attachment position of the extraction portion. As a result, it is possible to suppress the breakage of the extraction portion of the current collector plate during the vibration.

The spring portion may further include a second bent portion being where the plate material bends to a side opposite to the first bent portion when viewed from the connection portion. In this case, the plate material of the first piece portion that was arranged at a position different from the reference shape by the first bent portion, can be returned to the original reference shape by the second bent portion. As a result, the shape of the extraction portion can be kept in a state of not being excessively changed from the reference shape.

The spring portion may be formed in the first piece portion. Since the first piece portion extends in the direction orthogonal to the first direction, when the vibration to the first direction acts on the power storage device, the first piece portion deforms so as to alternately deflect to one side and the other side of the first direction. Here, since the spring portion can function as a node of the deflection, the deformation due to the vibration of the first piece portion can be reduced.

The bent portion may be arranged at a position opposite to the terminal block in the first direction with respect to the connection portion. In this case, the distance between the attachment position of the second piece portion with the terminal block and the bent portion can be increased. As described above, the bent portion is a portion that functions as one of the starting points of deformation at the time of attachment to the terminal block. Therefore, by increasing the distance between the attachment position and the bent portion, the deformation allowance is increased, and thus, the stress concentrated around the attachment portion can be relieved.

According to the present disclosure, a power storage device capable of suppressing a problem in the extraction portion of the current collector plate during vibration, can be provided.

DETAILED DESCRIPTION

Figure 1:
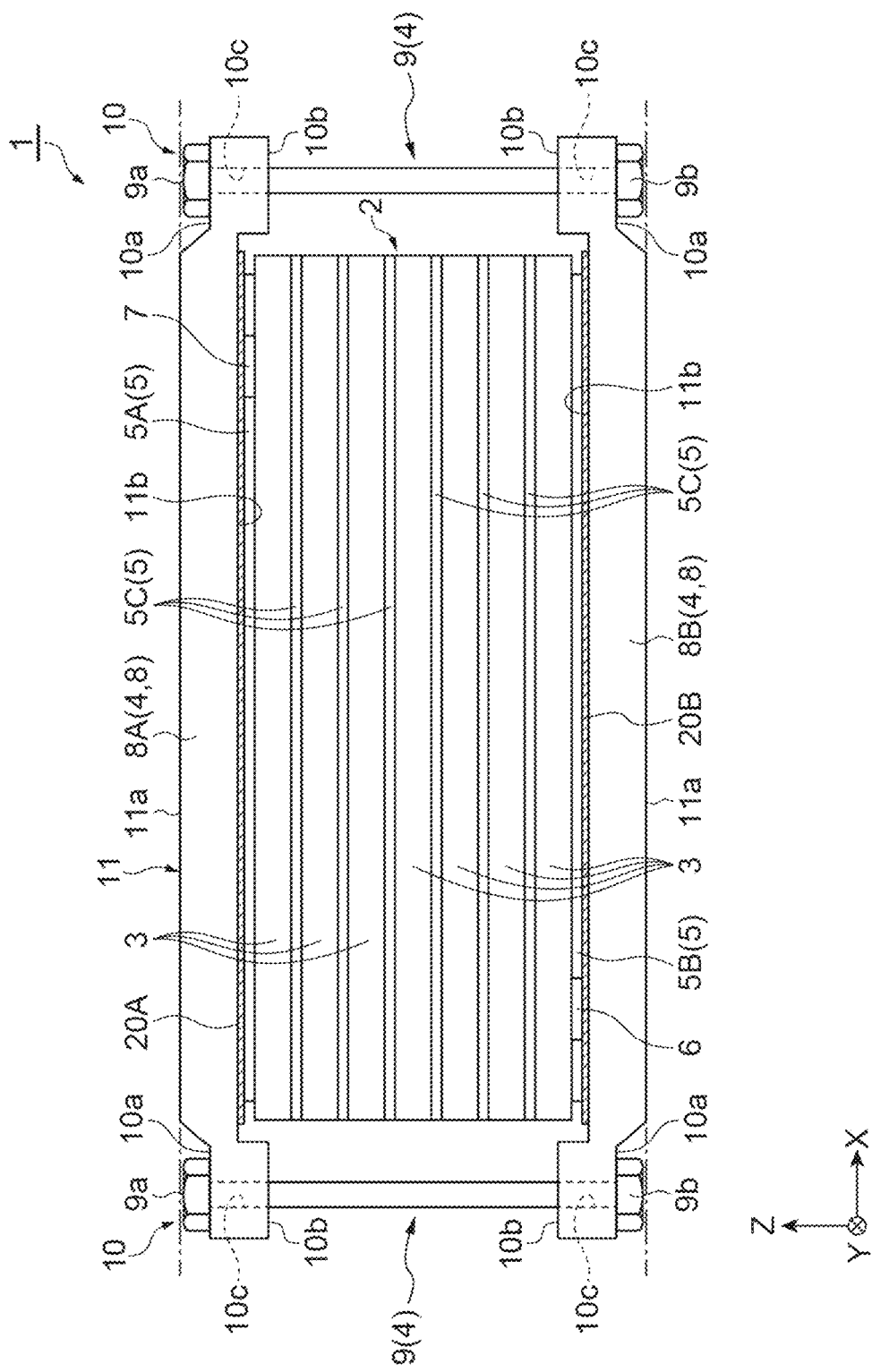
FIG. 1 is a perspective view of a power storage device according to an embodiment.

Hereinafter, embodiments of the present disclosure will be described in detail with reference to the accompanying drawings. In the description of the drawings, the same reference numerals are used for the same or equivalent elements, and duplicate descriptions are omitted.

A power storage device 1 according to the present embodiment will be described with reference to FIG. 1. FIG. 1 is a side view of the power storage device 1.

The power storage device 1 is used as a battery for various vehicles such as forklifts, hybrid vehicles, and electric vehicles. The power storage device 1 includes a module stack body 2 and a restraint member 4. The module stack body 2 includes a plurality of stacked power storage modules 3. The restraint member 4 applies a restraint load to the module stack body 2 from both sides in the stacking direction (first direction). The power storage module 3 has, for example, a rectangular shape when viewed from the stacking direction. In the present specification, for convenience of explanation, the stacking direction is defined as the Z-axis direction, the longitudinal direction of the power storage module 3 viewed from the stacking direction is defined as the Y-axis direction, and the lateral direction of the power storage module 3 is defined as the X-axis direction. The stacking direction is a direction in which the power storage module 3 and a pair of current collector plates 5A and 5B (described later) are stacked.

The module stack body 2 includes a plurality of (7 in the present embodiment) power storage module 3 and a plurality of (8 in the present embodiment) current collector plates 5. As an example, the power storage module 3 is a bipolar battery. The power storage module 3 is a secondary battery such as a nickel hydrogen secondary battery and a lithium ion secondary battery. However, the power storage device 1 is not limited to the above-described secondary batteries, and may be, for example, an electric double layer capacitor. In the present embodiment, the power storage device 1 is a nickel hydrogen secondary battery.

The plurality of power storage modules 3 are stacked via the current collector plates 5. The power storage modules 3 adjacent to each other in the Z-axis direction are electrically connected to each other via the current collector plates 5. In the present embodiment, as illustrated in FIG. 1, the plurality of (8) current collector plates 5 are configured with a current collector plate 5A on one end side in the Z-axis direction, a current collector plate 5B on the other end side, a plurality of (6) current collector plate 5C interposed between the power storage modules 3. The current collector plates 5C are provided between the power storage modules 3 adjacent to each other in the Z-axis direction. Between the power storage modules 3 adjacent to each other in the Z-axis direction, the current collector plates 5C are contact-arranged between the electrode exposed portions of the electrode stacked bodies facing each other.

The current collector plates 5A and 5B are provided at the positive side and the negative side in the Z-axis direction of the power storage module 3 positioned at the stacking end of the plurality of power storage modules 3. In this way, the current collector plates 5A and 5B are stacked so as to interpose the power storage modules 3 in the Z-axis direction, which is the stacking direction. As illustrated in FIG. 1, a negative electrode terminal 7 (extraction portion) is connected to one of the current collector plates 5A. A positive electrode terminal 6 (extraction portion) is connected to the other current collector plate 5B. The negative electrode terminal 7 and the positive electrode terminal 6 protrude from the edge portions of the current collector plates 5A and 5B in the Y-axis direction. The power storage device 1 is charged and discharged via the negative electrode terminal 7 and the positive electrode terminal 6. The negative electrode terminal 7 and the positive electrode terminal 6 are provided at the end portions of the power storage device 1 at the negative side in the Y-axis direction. In addition, in the present embodiment, the negative electrode terminal 7 is provided at a position closer to the positive side in the X-axis direction, and the positive electrode terminal 6 is provided at a position closer to the negative side in the X-axis direction.

The restraint member 4 includes a pair of restraint plates 8 (a restraint plate 8A at the negative electrode terminal 7 side and a restraint plate 8B at the positive electrode terminal 6 side) that interpose the module stack body 2 from both sides in the Z-axis direction, and a plurality of connecting members 9 that connect the pair of restraint plates 8. The pair of restraint plates 8 restrain the power storage module 3 and the current collector plates 5A and 5B in the Z-axis direction, which is the stacking direction. The connecting member 9 applies the restraint load to the module stack body 2 in the Z-axis direction via the pair of restraint plates 8. In the present embodiment, the connecting member 9 is configured with a bolt 9a and a nut 9b for fastening a pair of restraint plates 8.

The restraint plate 8 is a rectangular metal plate having an area one size larger than areas of the power storage module 3 and the current collector plate 5 when viewed from the Z-axis direction. The restraint plate 8 includes a main body portion 11 that overlaps the module stack body 2 when viewed from the Z-axis direction, and an edge portion 10 that extends from the main body portion 11 in the X-axis direction and does not overlap the module stack body 2 when viewed from the Z-axis direction. In the present embodiment, a pair of edge portions 10 are provided on both sides of the main body portion 11 in the X-axis direction. That is, the main body portion 11 is interposed between the pair of edge portions 10. The edge portion 10 has an outer surface 10a facing the outside in the Z-axis direction (the side opposite to the power storage module 3 in the Z-axis direction) and an inner surface 10b facing the inside in the Z-axis direction (the power storage module 3 side in the Z-axis direction). The main body portion 11 has an outer surface 11a facing the outside in the Z-axis direction and an inner surface 11b facing the inside in the Z-axis direction. The outer surface 10a is positioned inside of the outer surface 11a in the Z-axis direction. The inner surface 10b is positioned inside of the inner surface 11b in the Z-axis direction.

The pair of edge portions 10 are outer edge portions extending in the longitudinal direction (Y-axis direction) of the restraint plate 8. The pair of edge portions 10 are arranged so as not to overlap the module stack body 2 when viewed from the Z-axis direction. Each edge portion 10 is provided with a plurality of insertion holes 10c into which a bolt 9a is inserted. In each edge portion 10, the plurality of insertion holes 10c are arranged so as to be separated from each other along the longitudinal direction (Y-axis direction) of the restraint plate 8. In the present embodiment, the plurality of insertion holes 10c are arranged at equal intervals from one end to the other end of the edge portion 10 in the longitudinal direction of the restraint plate 8.

A head of the bolt 9a is arranged on the outer surface 10a of the restraint plate 8A. A tip portion (screw tip) of a shaft portion of the bolt 9a protrudes from the outer surface 10a of the restraint plate 8B. A nut 9b is screwed into the tip portion of bolt 9a. The nut 9b is arranged on the outer surface 10a of the restraint plate 8B. In this way, the plurality of power storage modules 3 and the plurality of current collector plates 5 are interposed between the restraint plates 8A and 8B and are unitized as the module stack body 2. In addition, the restraint load in the Z-axis direction is applied to the module stack body 2.

An insulating plate 20A is provided between the current collector plate 5A and the restraint plate 8A. In addition, an insulating plate 20B is provided between the current collector plate 5B and the restraint plate 8B. The insulating plates 20A and 20B are members for ensuring the insulation between the current collector plates 5A and 5B and the restraint plates 8A and 8B.

Figure 2:
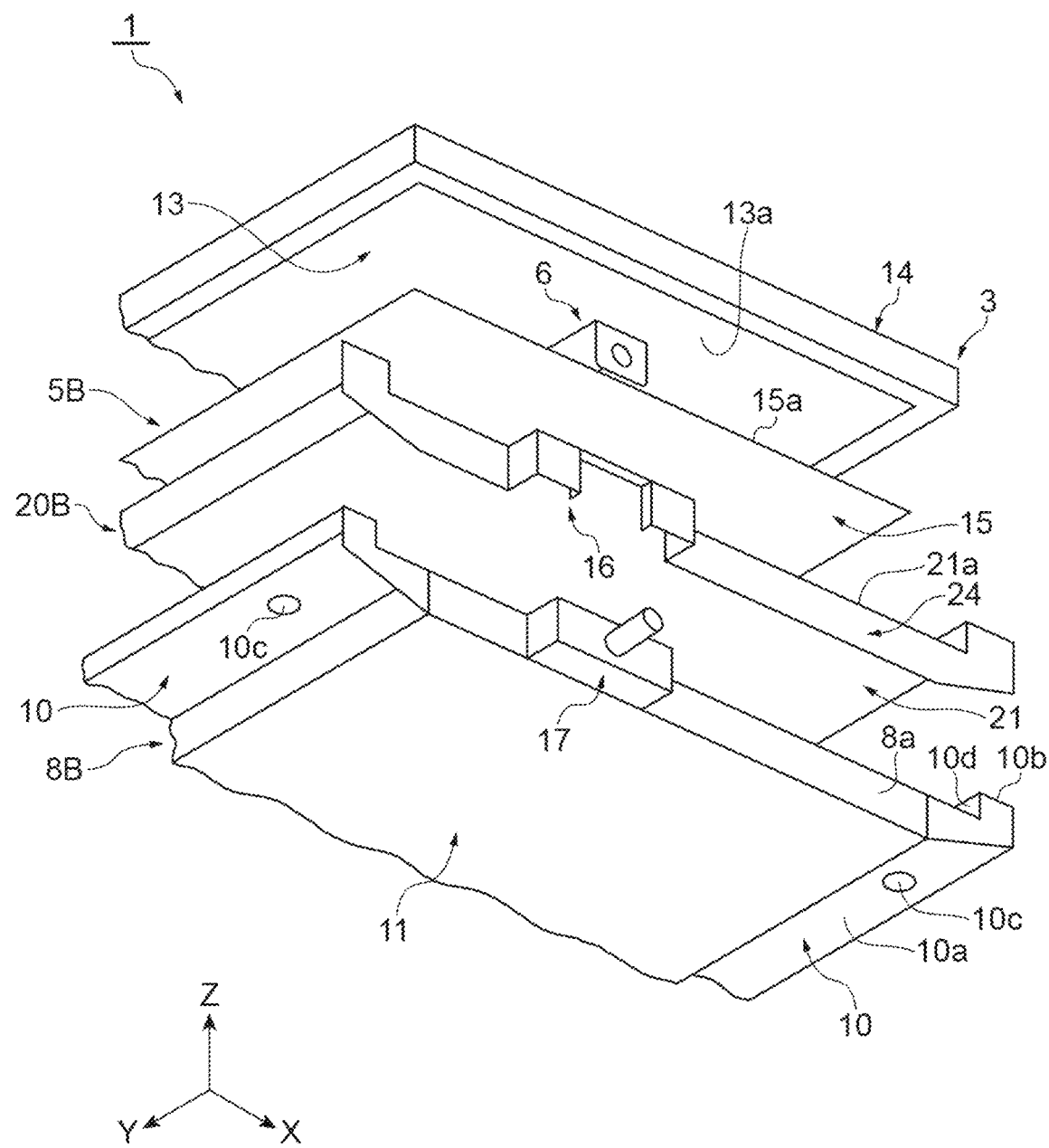
FIG. 2 is a developed perspective view of a configuration of the power storage device near an end portion on a negative side in the Z-axis direction.

Next, a configuration of the power storage device 1 near the end portion in the Z-axis direction will be described in more detail with reference to FIG. 2. FIG. 2 is a developed perspective view of the configuration of the power storage device 1 near the end portion on a negative side in the Z-axis direction. In FIG. 2, the configuration near the end portion corresponding to the negative side (positive electrode terminal 6 side) in the Z-axis direction will be described, however, near the end portion corresponding to the positive side (negative electrode terminal 7 side) in the Z-axis direction also has a structure of the same effect.

As illustrated in FIG. 2, the power storage device 1 includes the power storage module 3 at the end portion in the Z-axis direction, a current collector plate 5B, the insulating plate 20B, and the restraint plate 8B near the end portion at the negative side in the Z-axis direction. The power storage module 3, the current collector plate 5B, the insulating plate 20B, and the restraint plate 8B have a rectangular plate shape with the Y-axis direction as the longitudinal direction.

The power storage module 3 is configured with a bipolar electrode in which a positive electrode is formed on one surface of the electrode plate and a negative electrode is formed on the other surface, and a stacked body 13 configured by stacking a plurality of separators. In addition, a frame-shaped sealing member 14 (frame body) is provided on the side surface of the stacked body 13 so that the stacked body 13 is sealed by the sealing member 14. An electrolytic solution is sealed inside the stacked body 13 as a liquid. The power storage module 3 has current extraction surfaces 13a at both ends in the Z-axis direction. The current extraction surface 13a is a surface for extracting the current from the power storage module 3, and is formed by exposing the electrodes of the stacked body 13 from the sealing member 14.

The current collector plate 5B includes a plane-shaped flat plate portion 15 provided for the power storage module 3 and the positive electrode terminal 6 described above. The flat plate portion 15 is in contact with the current extraction surface 13a of the power storage module 3. The whole area of the flat plate portion 15 is formed in a shape and size that overlaps with the current extraction surface 13a when viewed from the Z-axis direction. The positive electrode terminal 6 is formed on the outer edge portion 15a of the flat plate portion 15 at the negative side in the Y-axis direction. In this way, a pair of current collector plate 5A (refer to FIG. 1) and the current collector plate 5B are provided so as to interpose the current extraction surfaces 13a on both end sides in the stacking direction. In the present embodiment, a plurality of power storage modules 3 are stacked. Therefore, the current collector plate 5A (refer to FIG. 1) is in contact with the current extraction surface 13a at the positive side in the Z-axis direction of the power storage module 3 at the positive side in the Z-axis direction, and the current collector plate 5B is in contact with the current extraction surface 13a at the negative side of the power storage module 3 in the Z-axis direction, at the negative side in the Z-axis direction. However, the power storage device 1 may include one power storage module 3. In this case, the current collector plates 5A and 5B are provided so as to interpose the current extraction surfaces 13a on both sides of one power storage module 3.

The insulating plate 20B is a member formed of an insulation material such as resin, which is provided between the current collector plate 5B and the restraint plate 8B. The insulating plate 20B is a member provided to ensure the insulation between the current collector plate 5B and the restraint plate 8B. The insulating plate 20B is arranged so as to overlap the entire area of the flat plate portion 15 of the current collector plate 5B when viewed from the Z-axis direction. As a result, the insulating plate 20B is interposed at a location where the current collector plate 5B and the restraint plate 8B face each other, therefore, the insulation between the current collector plate 5B and the restraint plate 8B is ensured. A terminal block protection portion 16 covering the terminal block 17, which will be described later, is formed on a cover portion 24 of the insulating plate 20B at the negative side in the Y-axis direction. The more detailed configuration of the insulating plate 20B will be described later.

As described above, the restraint plate 8B includes a plane-shaped main body portion 11 and a pair of edge portions 10 in which an insertion hole 10c for inserting a bolt is formed. The terminal block 17 is provided on the outer edge portion 8a of the restraint plate 8B at the negative side in the Y-axis direction. The positive electrode terminal 6 and wiring (not illustrated) are connected to the terminal block 17.

Figure 3:
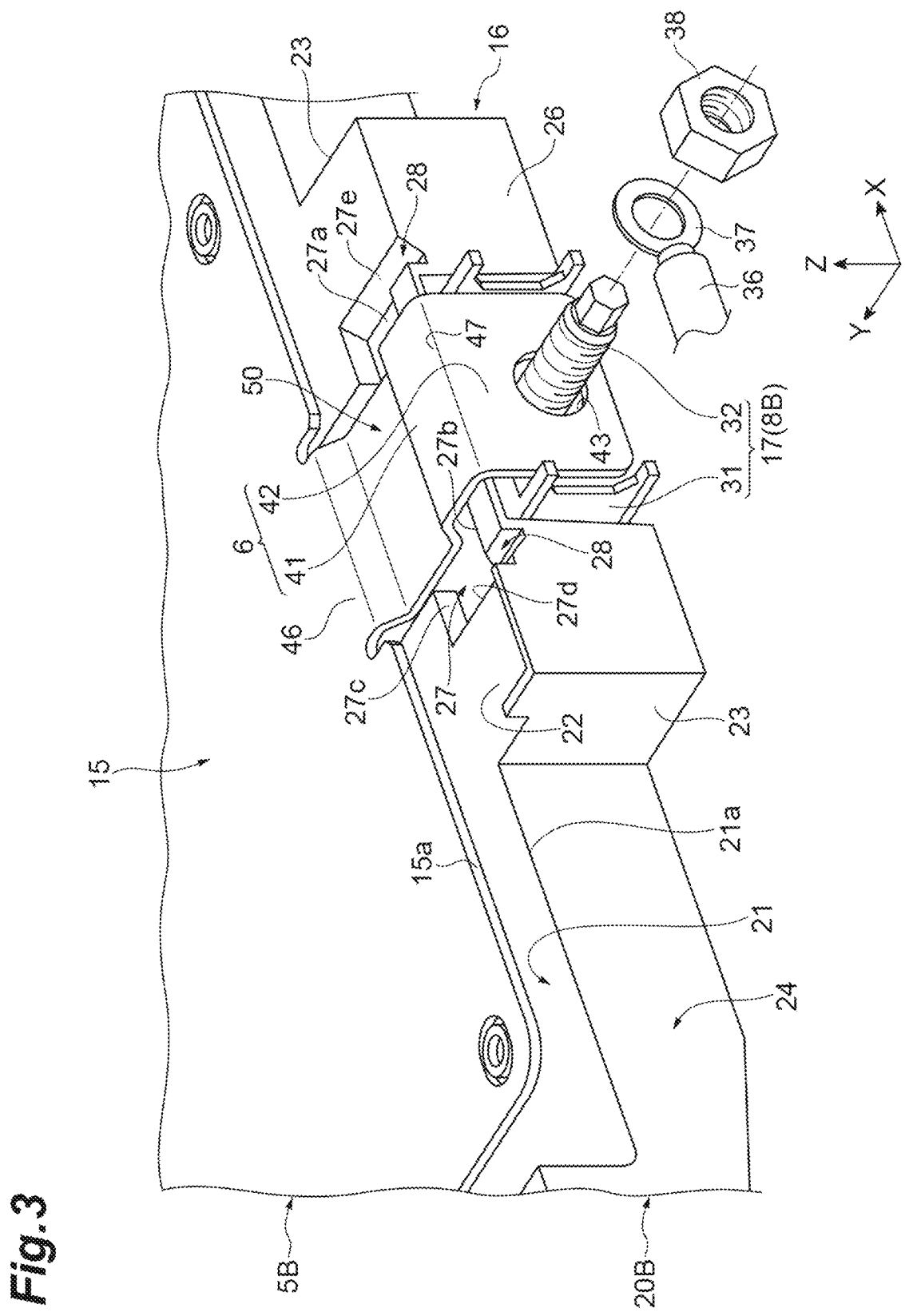
FIG. 3 is a perspective view of a connection structure between a positive electrode terminal and a terminal block.
Figure 4:
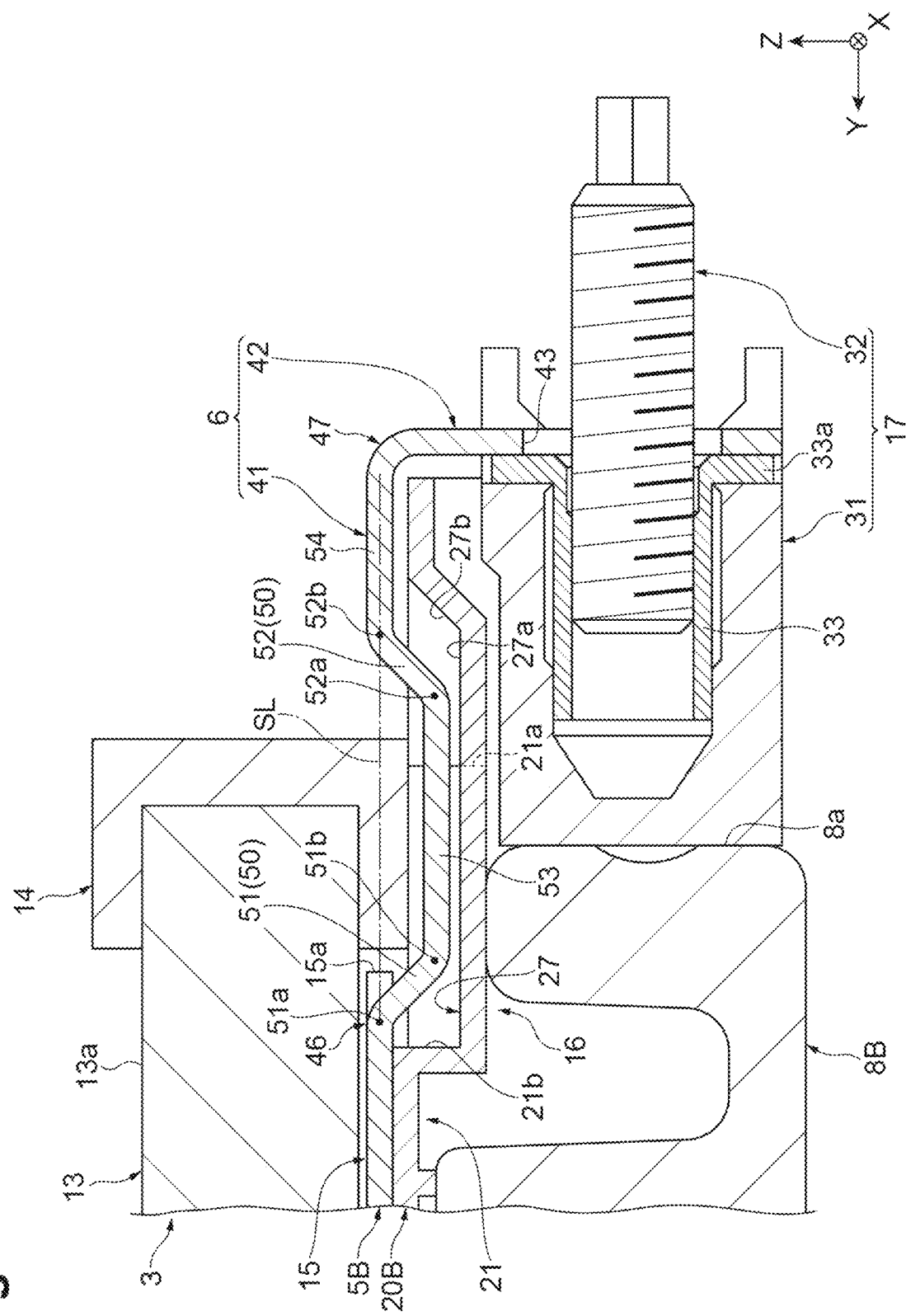
FIG. 4 is a cross-sectional view of the connection structure between the positive electrode terminal and the terminal block.

Next, a connection structure between the positive electrode terminal 6 and the terminal block 17 will be described in detail with reference to FIGS. 3 and 4. FIG. 3 is a perspective view of the connection structure between the positive electrode terminal 6 and the terminal block 17. FIG. 4 is a cross-sectional view of the connection structure between the positive electrode terminal 6 and the terminal block 17. From FIG. 3, the power storage module 3 is omitted. In the following description, the explanation will be made on the basis of a posture in which the current collector plate 5B is arranged at the lower side of the power storage module 3 in the vertical direction while taking a relationship with a flow of liquid leaking from the power storage module 3 into consideration. That is, the liquid flows from the positive side to the negative side in the Z-axis direction. In the following description, sometimes the positive side in the Z-axis direction may be referred to as "upper" and the negative side in the Z-axis direction may be referred to as "lower". The restraint plate 8A, the current collector plate 5A, and the insulating plate 20A are also provided at the positive side in the Z-axis direction, and therefore, the restraint plate 8A, the current collector plate 5A, and the insulating plate 20A are also vertically symmetrical with the restraint plate 8B, the current collector plate 5B, and the insulating plate 20B at the negative side in the Z-axis direction illustrated in FIG. 3 to have a structure of the same effect. Therefore, when the positive side in the Z-axis direction is directed toward the lower side, since the liquid leaking from the power storage module 3 flows from the negative side in the Z-axis direction to the positive side, the insulating plate 20A on the restraint plate 8A side receives the liquid.

As illustrated in FIG. 3 and FIG. 4, the terminal block 17 includes a pedestal portion 31 and a fastening portion 32. The pedestal portion 31 has a rectangular parallelepiped shape having a longitudinal direction in the X-axis direction. The pedestal portion 31 is provided so as to protrude from the outer edge portion 8a (refer to FIG. 4) of the restraint plate 8B to the negative side in the Y-axis direction. The pedestal portion 31 protrudes from at least the power storage module 3 to the negative side in the Y-axis direction. A vertical size of the pedestal portion 31 is substantially the same as a vertical size of the outer edge portion 8a. The pedestal portion 31 is provided so as to extend in the X-axis direction in a part of the outer edge portion 8a of the main body portion 11 of the restraint plate 8B at the negative side region in the X-axis direction.

The fastening portion 32 is configured with a bolt protruding from the end surface of the pedestal portion 31 at the negative side in the Y-axis direction. The fastening portion 32 extends parallel to the Y-axis direction toward the negative side in the Y-axis direction. The fastening portion 32 is supported by a cylindrical support metal fitting 33 provided inside the pedestal portion 31 (refer to FIG. 4). The support metal fitting 33 includes a flange portion 33a extending from the fastening portion 32 toward the outer peripheral side at the end surface of the pedestal portion 31 at the negative side in the Y-axis direction (refer to FIG. 4). A second piece portion 42 of the positive electrode terminal 6 described later and a washer 37 connected to a wiring 36 are attached to the fastening portion 32 in such a manner of being pressed against the nut 38 fastened by the fastening portion 32 (refer to FIG. 3).

As illustrated in FIG. 3, the insulating plate 20B includes the main body portion 21 and the cover portion 24. The main body portion 21 is a plane-shaped portion arranged between the flat plate portion 15 of the current collector plate 5B and the main body portion 11 of the restraint plate 8. The main body portion 21 has a rectangular shape having a longitudinal direction in the Y-axis direction. The cover portion 24 extends downward from the outer edge portion 21a of the main body portion 21 at the negative side in the Y-axis direction. The cover portion 24 extends in the X-axis direction along the outer edge portion 21a. The terminal block protection portion 16 is provided so as to protrude from the cover portion 24 to the negative side in the Y-axis direction. The terminal block protection portion 16 has a box shape so as to accommodate the terminal block 17 inside.

The terminal block protection portion 16 includes an upper wall portion 22 extending from the main body portion 21 to the negative side in the Y-axis direction, a pair of side wall portions 23 and 23 extending from the cover portion 24 to the negative side in the Y-axis direction, and an end wall portion 26 extending parallel to the cover portion 24 on the end portion of the upper wall portion 22 and the side wall portions 23 and 23 at the negative side in the Y-axis direction. The upper wall portion 22 is arranged so as to cover the pedestal portion 31 of the terminal block 17 from above. The side wall portions 23 and 23 are arranged so as to cover the terminal block 17 from both sides in the X-axis direction. In the Y-axis direction, the end wall portion 26 is arranged at substantially the same position as the end portion of the pedestal portion 31 of the terminal block 17 at the negative side in the Y-axis direction. The end wall portion 26 is opened at the position of the terminal block 17 such that the terminal block 17 is exposed.

In the upper wall portion 22 of the terminal block protection portion 16, a recess portion 27 that is recessed downward from the other regions is formed. The recess portion 27 has a function of receiving and storing the liquid when the liquid leaks from the power storage module 3. The recess portion 27 includes a bottom surface 27a, long side portions 27b and 27c, and short side portions 27d and 27e. The bottom surface 27a extends parallel to the XY plane at a lower position than other regions of the upper wall portion 22. The long side portion 27b extends parallel to the X-axis direction on a position near the end portion of the upper wall portion 22 at the negative side in the Y-axis direction. The long side portion 27b is provided at a position separated from the end wall portion 26 at the positive side in the Y-axis direction. The long side portion 27b extends parallel to the X-axis direction at a position corresponding to the outer edge portion 21a of the main body portion 21 in the Y-axis direction. The short side portions 27d and 27e extend parallel to the Y-axis direction at a position separated from both end portions of the terminal block 17 toward the outside in the X-axis direction. The recess portion 27 is also formed on the location where the positive electrode terminal 6 passes among the main body portion 21. The recess portion 27 extends to a stepped portion 21b provided at the position at the positive side of the flat plate portion 15 of the current collector plate 5B in the Y-axis direction (refer to FIG. 4). Groove portions 28 and 28 extending to the end wall portion 26 are formed on both end portions of the long side portion 27b of the recess portion 27 in the X-axis direction. The groove portions 28 and 28 can discharge the liquid stored in the recess portion 27 to the end wall portion 26 side at a position avoiding the terminal block 17.

Next, the configuration of the positive electrode terminal 6 will be described in detail. As illustrated in FIG. 3, the positive electrode terminal 6 includes a first piece portion 41, a second piece portion 42, and a bent portion 47, and therefore, the positive electrode terminal 6 is formed in a substantially L shape when viewed from the X-axis direction. The first piece portion 41 is a plate-shaped portion extending to a direction orthogonal to the stacking direction (here, Y-axis direction) from the outer edge portion 15a provided on the edge of the flat plate portion 15 when viewed from the stacking direction (Z-axis direction in this case). The state in which the first piece portion 41 extends in the direction orthogonal to the stacking direction includes a state in which the first piece portion 41 is slightly inclined with respect to the stacking direction due to the influence of manufacturing errors and the like, in addition to a state in which the first piece portion 41 becomes completely 90° with respect to the stacking direction. The first piece portion 41 is a plate-shaped portion extending from the outer edge portion 15a of the flat plate portion 15 in the direction in which the flat plate portion 15 extends (here, the Y-axis direction). The second piece portion 42 is a portion extending in the Z-axis direction and having a through hole 43 (attachment portion) that attaches the positive electrode terminal 6 to the terminal block 17. The structure of the attachment portion is not limited to the through hole 43, and can be appropriately changed depending on the attachment structure with the terminal block 17. The second piece portion 42 is a plate-shaped portion that is bent from the tip portion of the first piece portion 41 to the terminal block 17 side (lower side) along the stacking direction and is attached while being pressed by the terminal block 17. The through hole 43 penetrating in the Y-axis direction is formed at a substantially center position of the second piece portion 42. The fastening portion 32 is inserted through the through hole 43. Both the first piece portion 41 and the second piece portion 42 extend parallel to the X-axis direction, and thus, the sizes of both in the X-axis direction are the same. The bent portion 47 is a portion being where the plate material configuring the positive electrode terminal 6 bends, and connecting the first piece portion 41 and the second piece portion 42.

In the description below, a boundary portion between the flat plate portion 15 and the positive electrode terminal 6 will be referred to as a connection portion 46 of the first piece portion 41. When the positive electrode terminal 6 is pressed against the terminal block 17 and attached, the positive electrode terminal 6 is deformed as a whole (refer to FIG. 5). At this time, the connection portion 46 becomes the starting point of the deformation of the first piece portion 41 and the second piece portion 42. The bent portion 47 described above corresponds to the boundary portion between the first piece portion 41 and the second piece portion 42. The bent portion 47 is a location where a displacement is small even after the deformation. Therefore, the bent portion 47 is the starting point of the deformation of the second piece portion 42. In addition, in the description above, a "length" relating to the positive electrode terminal 6 is assumed to be a length that corresponds to a length of the neutral axis of the plate material configuring each piece portion 41 and 42 of the positive electrode terminal in the cross-sectional view from the X-axis direction. For example, the length of the first piece portion 41 is equal to the dimension in the Y-axis direction between the connection portion 46 and the bent portion 47 in the plate material when the bending of the spring portion 50 is straightened.

The spring portion 50 that relieves the stress acting on the positive electrode terminal 6 is formed on the positive electrode terminal 6. This spring portion 50 can relieve the stress acting on the positive electrode terminal 6 after the positive electrode terminal 6 is attached to the terminal block 17 while being pressed by the fastening portion 32 and the nut 38.

The detailed configuration of the spring portion 50 will be described with reference to FIG. 4. In the description below, a term "reference shape" of the positive electrode terminal 6 may be used. The reference shape is the shape of the positive electrode terminal 6 when the spring portion 50 is not provided, and specifically, the shape illustrated in FIG. 7A and FIG. 7B. The cross-sectional shape of the first piece portion 41 in the reference shape extends parallel to the Y-axis direction in between the connection portion 46 and the bent portion 47, and extends in a straight line shape without bending in the middle. The cross-sectional shape of the second piece portion 42 in the reference shape extends parallel to the downward direction from the bent portion 47, and extends in the straight line shape without bending in the middle.

When defining the reference shape like this, the spring portion 50 is defined so as to be arranged at a position different from that of the reference shape by deforming the plate material such that the length of the positive electrode terminal 6 is longer than the length of the reference shape. In the present embodiment, the spring portion 50 is formed in the first piece portion 41. Therefore, the first piece portion 41 is arranged at a position deviated from the reference shape SL (indicated by a virtual line in FIG. 4) at the location of the spring portion 50. On the other hand, the spring portion 50 is not formed in the second piece portion 42. Therefore, the second piece portion 42 has the same shape as the reference shape.

Specifically, between the connection portion 46 and the through hole 43 in the positive electrode terminal 6, there is the spring portion 50 that relieves the stress acting on the positive electrode terminal 6. In addition to the bent portion 47, the spring portion 50 has a bent portion 51 (first bent portion) being where the plate material configuring the positive electrode terminal 6 bends. The bent portion 51 is a portion where the plate material of the first piece portion 41 is bent toward the lower side when viewed from the connection portion 46. When viewed from the bent portion 47, the plate material is bent to the upper side at bent portion 51. In the following description of the bent portions 51 and 52, unless otherwise specified, the state as viewed from the connection portion 46 will be described. Here, the bent portion 51 is bent so as to incline downward as the plate material of the first piece portion 41 advances to the negative side in the Y-axis direction. The bent portion 51 has bending points 51a and 51b that bends the plate material. The bending point 51a is formed at the end portion of the bent portion 51 at the positive side in the Y-axis direction, and the bending point 51b is formed at the end portion of the bent portion 51 at the negative side in the Y-axis direction. At the bending point 51a, the plate material bends so as to incline downward. In the present embodiment, the bending point 51a is formed at the position of the connection portion 46. At the bending point 51b, the plate material bends so as to return to the state of being parallel to the Y-axis direction from the state of being inclined downward. The first piece portion 41 includes an extending portion 53 extending parallel to the Y-axis direction from the bending point 51b toward the negative side in the Y-axis direction.

The spring portion 50 further includes a bent portion 52 (second bent portion) being where the plate material bends to the opposite side of the bent portion 51 when viewed from the connection portion 46. The bent portion 52 is a portion where the plate material of the first piece portion 41 is bent toward the upper side when viewed from the connection portion 46. Here, the bent portion 52 is bent so as to incline upward as the plate material of the first piece portion 41 advances toward the negative side in the Y-axis direction. The bent portion 52 includes bending points 52a and 52b for bending the plate material. The bending point 52a is formed at the end portion of the bent portion 52 at the positive side in the Y-axis direction, and the bending point 52b is formed at the end portion of the bent portion 52 at the negative side in the Y-axis direction. In the bending point 52a, the plate material bends so as to incline upward. In the bending point 52b, the plate material bends so as to return to the state of being parallel to the Y-axis direction from the state of being inclined upward. The first piece portion 41 includes an extending portion 54 extending parallel to the Y-axis direction from the bending point 52b toward the negative side in the Y-axis direction.

Due to the bent portions 51 and 52 described above, the extending portion 53 is arranged at a position on the lower side of the reference shape SL, that is, a position one stage lower than the flat plate portion 15. The extending portion 54 is arranged at the same position as the reference shape SL, that is, at the same height as the flat plate portion 15. That is, the first piece portion 41 has a shape that is lowered by one stage at the bent portion 51 and returned to the original position at the bent portion 52.

Here, the extending portion 53 is arranged below the sealing member 14 of the power storage module 3. The sealing member 14 extends to a position lower than the reference shape SL. That is, the sealing member 14 is arranged so as to be inserted into the recess shape formed by the bent portions 51 and 52 and the extending portion 53. Then, the extending portion 53 is arranged so as to be inserted into the recess portion 27 of the insulating plate 20B. In this way, the first piece portion 41 makes it possible to arrange the power storage module 3 at a low position while avoiding interference with the insulating plate 20B and the sealing member 14. As a result, the power storage device 1 can be made compact. In addition, with this structure, the liquid from the power storage module 3 can be received and drained at the recess portion 27. With the configuration described above, the bent portion 51 is arranged in a space between the stepped portion 21b of the insulating plate 20B and the sealing member 14 in the Y-axis direction. The bent portion 52 is arranged in a space between the long side portion 27b of the recess portion 27 of the insulating plate 20B and the sealing member 14 in the Y-axis direction.

Next, the actions and effects of the power storage device 1 according to the present embodiment will be described. The following actions and effects are also exhibited in the structure on the current collector plate 5A side.

In the power storage device 1, the current collector plate 5B includes a positive electrode terminal 6 that extracts the current from the power storage module 3, and the restraint plate 8B includes the terminal block 17 connected to the positive electrode terminal 6. Therefore, the positive electrode terminal 6 can extract the current to the terminal block 17 by being connected to the terminal block 17. Here, the positive electrode terminal 6 includes the plate-shaped first piece portion 41 extending in the Y-axis direction (direction orthogonal to the stacking direction) from the outer edge portion 15a provided on the edge of the flat plate portion 15 when viewed from the Z-axis direction (stacking direction), the second piece portion 42 having a through hole 43 extending to the Z-axis direction and fixing the positive electrode terminal 6 to the terminal block 17, the bent portion 47 being where the plate material configuring the positive electrode terminal 6 bends, and connecting the first piece portion 41 and the second piece portion 42 to each other.

Figure 5:
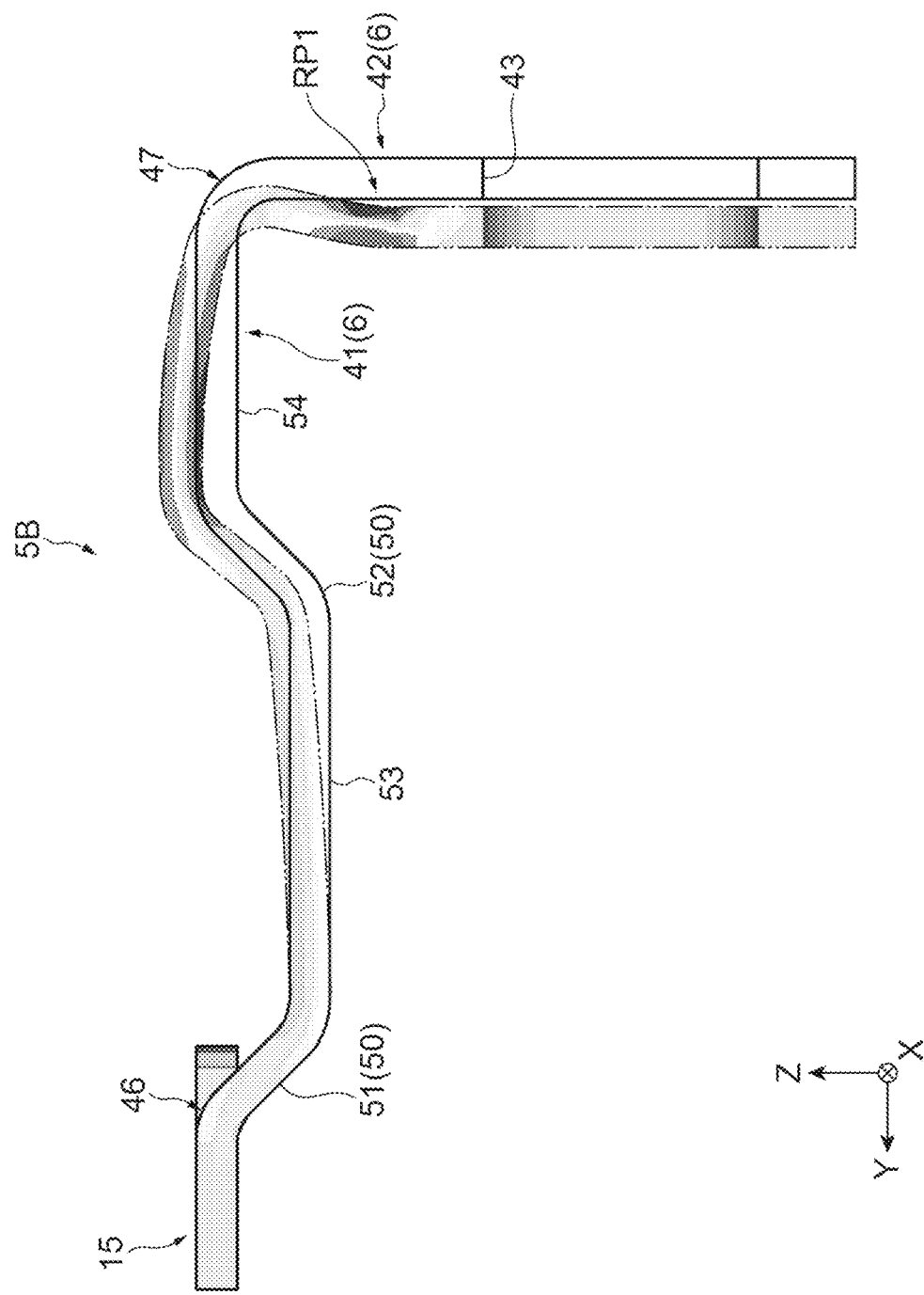
FIG. 5 is a diagram illustrating a state of deformation of the positive electrode terminal at the time of attaching to the terminal block.

Here, with reference to FIG. 5, a deformation mode of the positive electrode terminal 6 when the second piece portion 42 is attached while being pressed against the terminal block 17 will be described. The virtual line in FIG. 5 indicates the positive electrode terminal 6 after the deformation. Further, in the virtual line, the distribution of stress acting on the positive electrode terminal 6 is illustrated. It means that the color of the location is darker, the stress is greater. In FIG. 5, in order to make the stress distribution easier to see, hatching for the positive electrode terminal 6 is omitted. In the L-shaped cross section such as the positive electrode terminal 6, the bent portion 47 functions as one of the starting points of deformation at the time of attachment to the terminal block 17, as shown in FIG. 5. In addition, a distance between the bent portion 47 and the attachment position (through hole 43) to the terminal block 17 is short. Therefore, when the second piece portion 42 is attached while being pressed against the terminal block 17, the stress near the attachment position becomes large (refer to, for example, stress concentrated location RP1). If vibration occurs in this state, the stress concentrated location RP1 may be damaged and the positive electrode terminal 6 may be broken. Unlike the stress concentrated location RP1, not by the processing at the time of manufacturing the positive electrode terminal 6, the portion that bends as a result of stress at the time of attachment does not correspond to the bent portion in the present disclosure.

On the other hand, there is the spring portion 50 that relieves the stress acting on the positive electrode terminal 6 between the connection portion 46 to the outer edge portion 15a and the through hole 43 in the positive electrode terminal 6. The spring portion 50 includes at least the bent portion 51 being where plate material bends other than at the bent portion 47. By forming such a spring portion 50 between the connection portion 46 of the positive electrode terminal 6 and the through hole 43, it is possible to relieve the stress concentrated near the attachment position of the positive electrode terminal 6. As illustrated in FIG. 5, in the positive electrode terminal 6, in addition to the bent portion 47, the connection portion 46 also functions as one of the starting points of deformation. Therefore, if the spring portion 50 exists at any location between the connection portion 46 and the attachment position, the stress concentrated in the stress concentrated location RP1 can be dispersed in the spring portion 50. As a result, it is possible to suppress the breakage of the positive electrode terminal 6 of the current collector plate 5B during the vibration. When increasing the overall length of the positive electrode terminal 6, the resistance increases. However, the inventors of the present application have found that the effect of stress relief has a greater advantage than the disadvantages due to the increase in resistance, and thus, have adopted the configuration described above.

Figure 7A:
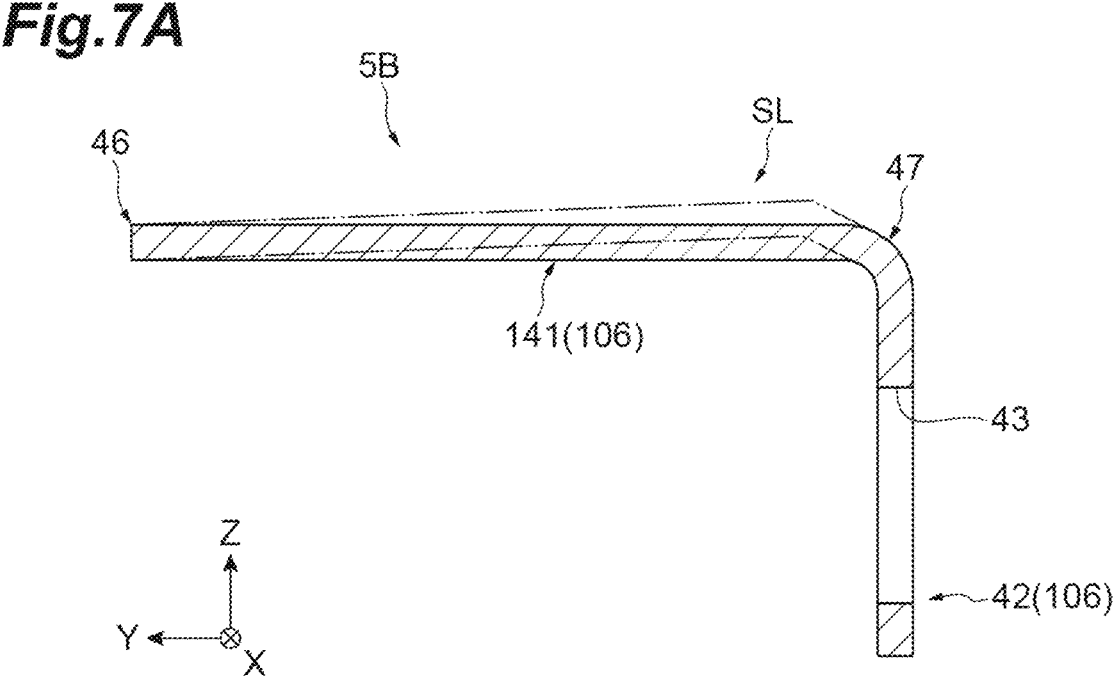
FIG. 7A and FIG. 7B are diagrams illustrating a positive electrode terminal of a power storage device according to a comparative example.
Figure 7B:
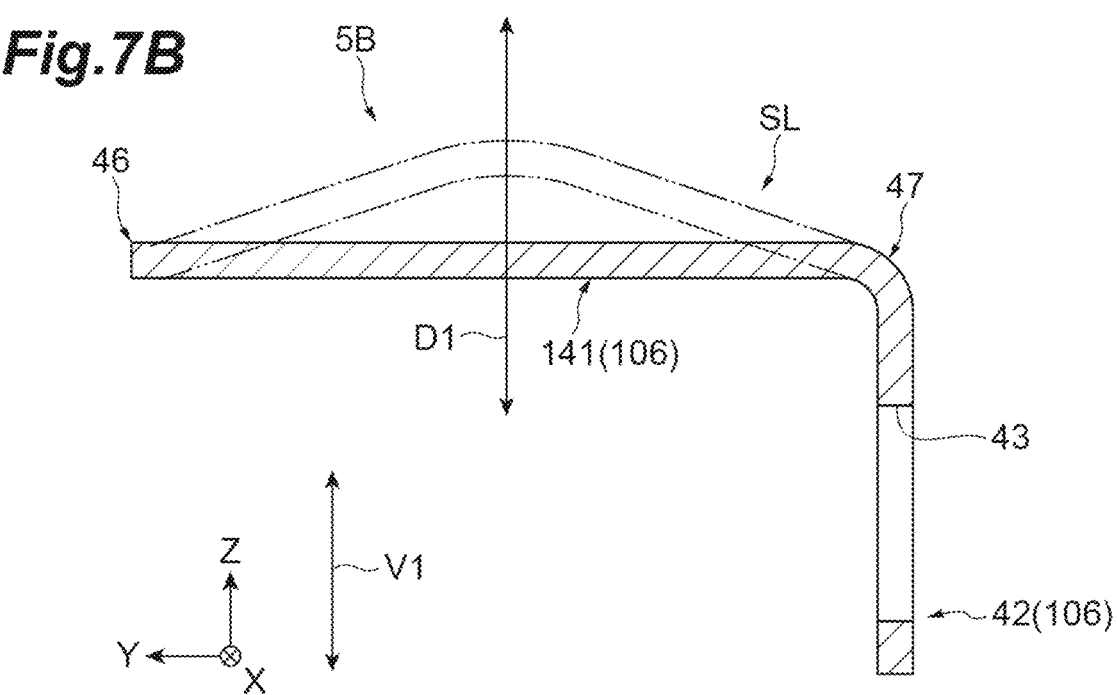

As a comparison example, a positive electrode terminal 106 shown in FIG. 7A and FIG. 7B will be described. The positive electrode terminal 106 includes a reference shape SL. As illustrated in FIG. 7A, in the positive electrode terminal 106 of the reference shape SL, the spring portion is not formed on the first piece portion 141. Therefore, a length of the plate material of the first piece portion 141 is shorter than that of the first piece portion 41 in the present embodiment. Then, the bending of the first piece portion 141 is small (refer to the virtual line in FIG. 7A), and the stress on the stress concentrated location RP1 that the first piece portion 141 can disperse is smaller than that in the present embodiment. Therefore, there is a high possibility that the stress concentrated location RP1 will be damaged.

The spring portion 50 includes at least a bent portion 51 being where the plate material configuring the positive electrode terminal 6 bends. By bending the plate material, the plate material of the positive electrode terminal 6 can be lengthened accordingly. In this case, the stress concentrated near the attachment position of the positive electrode terminal 6 can be dispersed and relieved by bending the positive electrode terminal 6 largely and easily in a whole. For example, as illustrated in FIG. 5, since the plate material is accordingly lengthened by the existence of the bent portions 51 and 52, the first piece portion 41 can be largely curved upward (compared to the first piece portion 141 in FIG. 7A). Then, since the area around the bent portion 47 also curves gently, the distortion near the stress concentrated location RP becomes soft, and therefore, it is possible to disperse the stress throughout the positive electrode terminal 6.

The spring portion 50 relieves the stress acting on the positive electrode terminal 6. As a result, it is possible to suppress the breakage of the positive electrode terminal 6 of the current collector plate 5B during the vibration.

The spring portion 50 may further include a bent portion 52 being where the plate material bends to the opposite side (upper side) of the bent portion 51 seen from the connection portion 46 to the flat plate portion 15 of the first piece portion 41. In this case, the plate material of the first piece portion 41 that was arranged at a position different from the reference shape SL by the bent portion 51, can be returned to the original reference shape SL by the bent portion 52. As a result, the shape of the positive electrode terminal 6 can be kept in a state of not being excessively changed from the reference shape SL. For example, when the shape illustrated in FIG. 8B is adopted, since the position of the bent portion is also changed, the shape near the terminal block 17 may also need to be redesigned. On the other hand, as illustrated in FIG. 4, in the bent portion 52, since the first piece portion 41 returns to the original reference shape SL, it is not necessary to change the shape near the terminal block 17. In addition, since the bent portion 52 bends the plate material upward, and the position of the bent portion 47 can be raised and moved away from the attachment position (through hole 43), it is possible to reduce the distortion near the stress concentrated location RP (compared to that in the structure in FIG. 8B).

Figure 6:
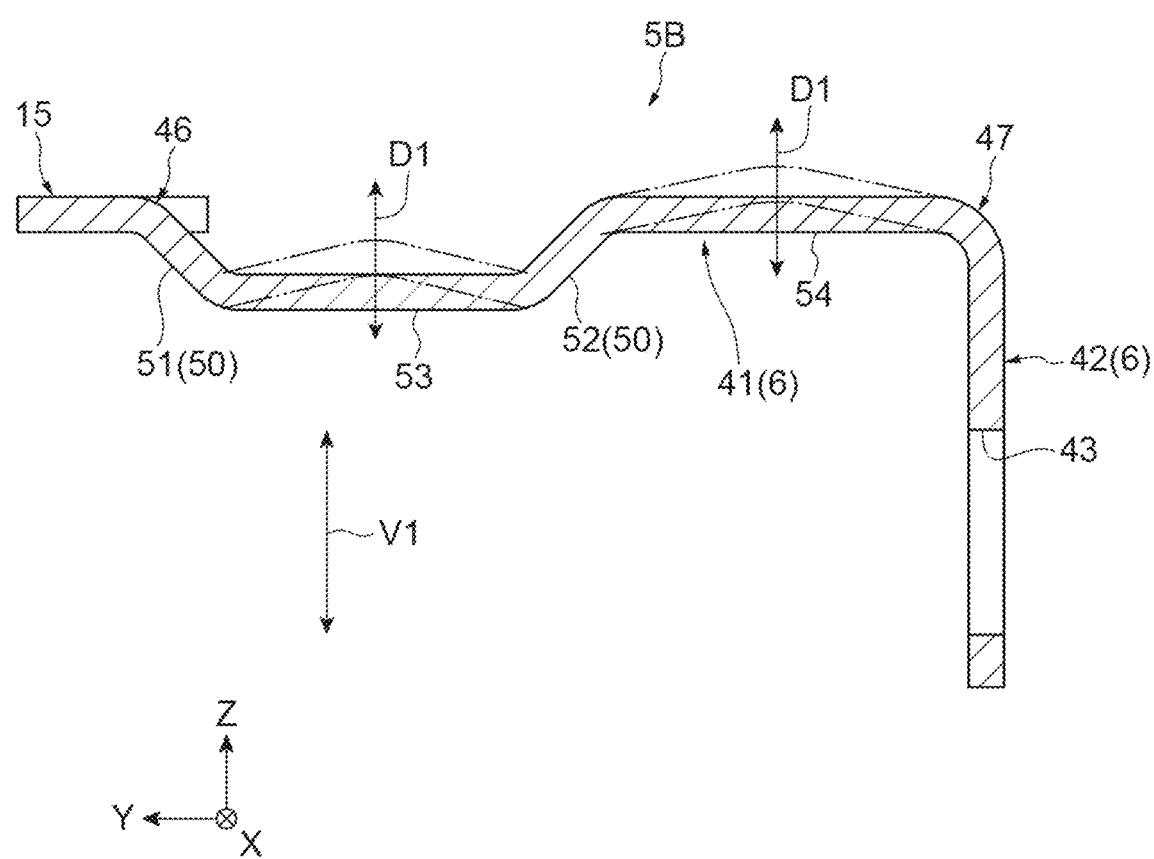
FIG. 6 is a diagram illustrating a state of deformation of the positive electrode terminal at the time of vibration.

The spring portion 50 may be formed on the first piece portion 41. Since the first piece portion 41 extends in the Y-axis direction, which is the direction intersecting the stacking direction, when the vibration V1 to the stacking direction acts on the power storage device 1, the first piece portion 41 deforms (refer to the deformation direction D1) so as to alternately deflect to one side and the other side of the stacking direction. Here, since the first piece portion 141 of the positive electrode terminal 106 according to the comparison example extends straight in the Y-axis direction over the entire area, the first piece portion 141 of the positive electrode terminal 106 vibrates greatly with the connection portion 46 and the bent portion 47 as the vibration nodes (refer to the deformation direction D2). In this case, since the first piece portion 141 comes into contact with the power storage module 3 (refer to FIG. 4) on the upper side, the vibration may be transmitted to the power storage module 3. On the other hand, in the present embodiment, since the spring portion 50 can function as a deflection node, the deformation due to the vibration of the first piece portion 41 can be reduced. Specifically, as illustrated in FIG. 6, the extending portion 53 vibrates with the bent portion 51 and the bent portion 52 as nodes. In addition, the extending portion 54 vibrates with the bent portion 52 and the bent portion 47 as nodes. Since the extending portions 53 and 54 are shorter than the overall length of the first piece portion 141 of the reference shape SL, the deformation becomes small. Therefore, the extending portions 53 and 54 are prevented from coming into contact with the power storage module 3, it is possible to suppress the transmission of the vibration to the power storage module 3.

The present disclosure is not limited to the embodiments described above.

Figure 8A:
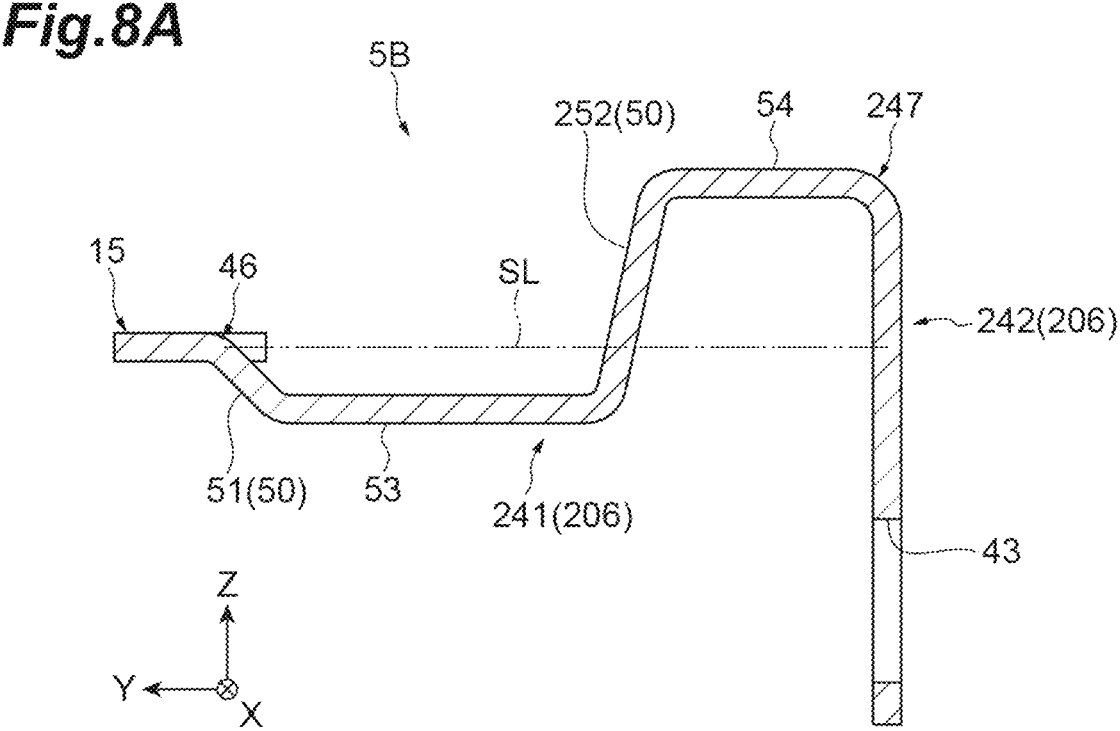
FIG. 8A and FIG. 8B are diagrams illustrating a positive electrode terminal of a power storage device according to a modification example.
Figure 8B:
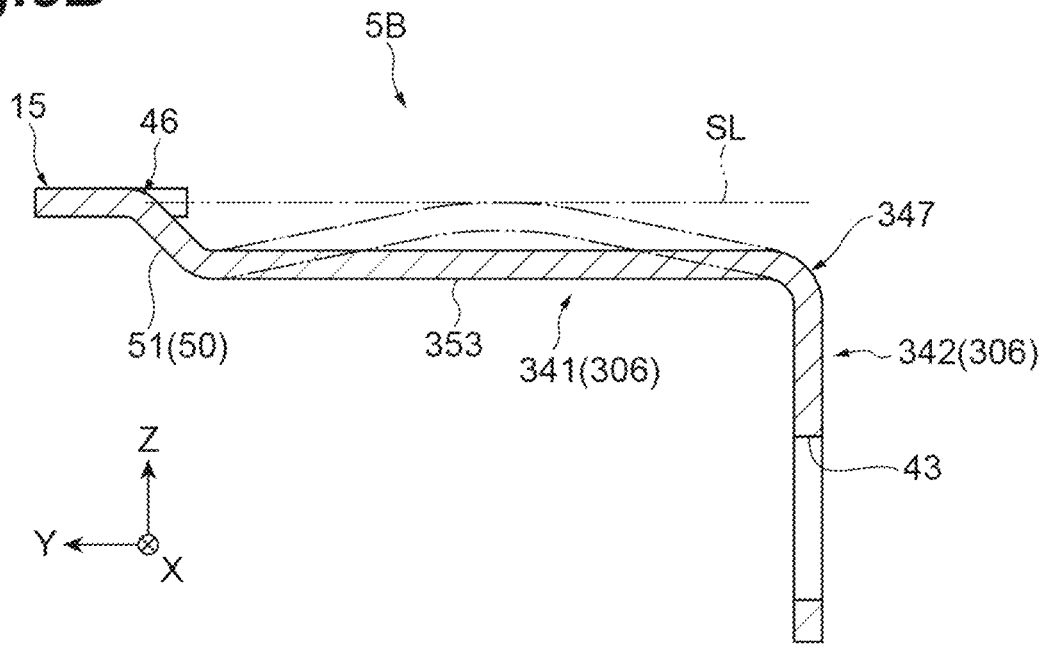

For example, a positive electrode terminal 206 illustrated in FIG. 8A may be adopted. In the positive electrode terminal 206, the bent portion 252 of the first piece portion 241 rises greatly, and the extending portion 54 is arranged on the upper side of the reference shape SL. In this case, the bent portion 247 between the first piece portion 241 and the second piece portion 242 is arranged at the upper side (a position opposite to the terminal block 17 in the stacking direction) of the connection portion 46 to the flat plate portion 15 of the first piece portion 241. In this case, the distance between the attachment position (through hole 43) of the second piece portion 242 with the terminal block 17 and the bent portion 247 can be increased. As described above, the bent portion 247 is a portion that functions as one of the starting points of deformation at the time of attachment to the terminal block 17. Therefore, by increasing the distance between the attachment position and the bent portion 247, the deformation allowance is increased, and thus, the stress concentrated around the attachment portion can be relieved.

In addition, a positive electrode terminal 306 illustrated in FIG. 8B may be adopted. In the positive electrode terminal 306, the first piece portion 341 does not include the bent portion 52 (refer to FIG. 4), and the extending portion 353, which is at one stage lower than the reference shape SL, extends to the bent portion 347 between the second piece portion 342 and the first piece portion 341. As described above, even if the spring portion 50 has only one bent portion 51, since the plate material can be lengthened and the deformation in the vertical direction at the time of vibration can be reduced, the same effect as described above can be obtained.

In addition, in the embodiment and modification example described above, the bent portion 51 bends the plate material to the lower side when viewed from the connection portion 46, but may bend to the upper side.

The position of the spring portion is not specified, and may be formed on the bent portion or may be formed on the second piece portion. In addition, the number of bent portions of the spring portion is not limited, and may be three or more.

In addition, in the embodiment and modification example described above, the bent portion is straightly inclined, but the bending mode of the bent portion is not particularly limited. For example, the bent portion may be bent in a curved manner, may be bent in a stepped manner, or may be bent such that the inclination angle gradually changes.

The spring portion described above may be formed on at least one of the positive electrode terminal 6 and the negative electrode terminal 7.

What is claimed is:
1. A power storage device comprising:
   a power storage module;
   a pair of current collector plates located at both ends of the power storage module in a first direction that is a stacking direction, so that the power storage module is sandwiched between the pair of current collector plates;

a pair of restraint plates configured to restrain the power storage module and the pair of current collector plates in the first direction, wherein:
the power storage module includes current extraction surfaces at both ends of the power storage module in the first direction, at least one of the current collector plates of the pair of current collector plates includes: a flat plate portion that is in electrical contact with at least one of the current extraction surfaces, and an extraction portion connected to the flat plate portion and configured to extract current from the power storage module, the extraction portion includes:
a first piece portion extending in a second direction orthogonal to the first direction from an outer edge portion provided on an edge of the flat plate portion when viewed from the first direction, wherein a boundary between the flat plate portion and the extraction portion is a connection portion of the first piece portion, a second piece portion extending in the first direction and having an attachment portion that attaches the extraction portion to a terminal block of a restraint plate of the pair of restraint plates, and a bent portion being where a plate material configuring the extraction portion bends, and connecting the first piece portion and the second piece portion, a spring portion provided between the connection portion and the attachment portion, wherein the spring portion is configured to relieve a stress acting on the extraction portion, and the spring portion includes a first bent portion and a second bent portion, and an extending portion that connects the first bent portion and the second bent portion, wherein the first bent portion has a first bending point and a second bending point spaced apart from the first bending point, wherein the second bent portion has a third bending point and a fourth bending point spaced apart from the third bending point, and wherein the extending portion connects the second bending point and the third bending point; and a sealing member having a frame-shape and provided on a side surface of the power storage module, wherein a surface of the sealing member is disposed between a virtual plane and the extending portion, wherein the virtual plane extends in the second direction, and wherein the first bending point and the fourth bending point are located on the virtual plane.

2. The power storage device according to claim 1, wherein the second bent portion is located where the plate material bends to a side opposite to the first bent portion when viewed from the connection portion.

3. The power storage device according to claim 1, wherein the spring portion is formed in the first piece portion.

4. The power storage device according to claim 1, wherein a distance between the bent portion and the terminal block is greater than a distance between the connection portion and the terminal block, in the first direction.

5. The power storage device according to claim 1, wherein the power storage module further includes an insulating plate disposed between the current collector plate and the restraint plate, wherein the insulating plate includes a recess portion, and an entirety of the extending portion is located within the recess portion.

* * * * *